356-150

March 2, 1965     B. BENDER     3,171,208
MEASURING INSTRUMENT

Filed June 29, 1961     4 Sheets—Sheet 1

INVENTOR.
BAXTER BENDER
BY
Ezekiel Wolf, Wolf & Greenfield
ATTORNEY

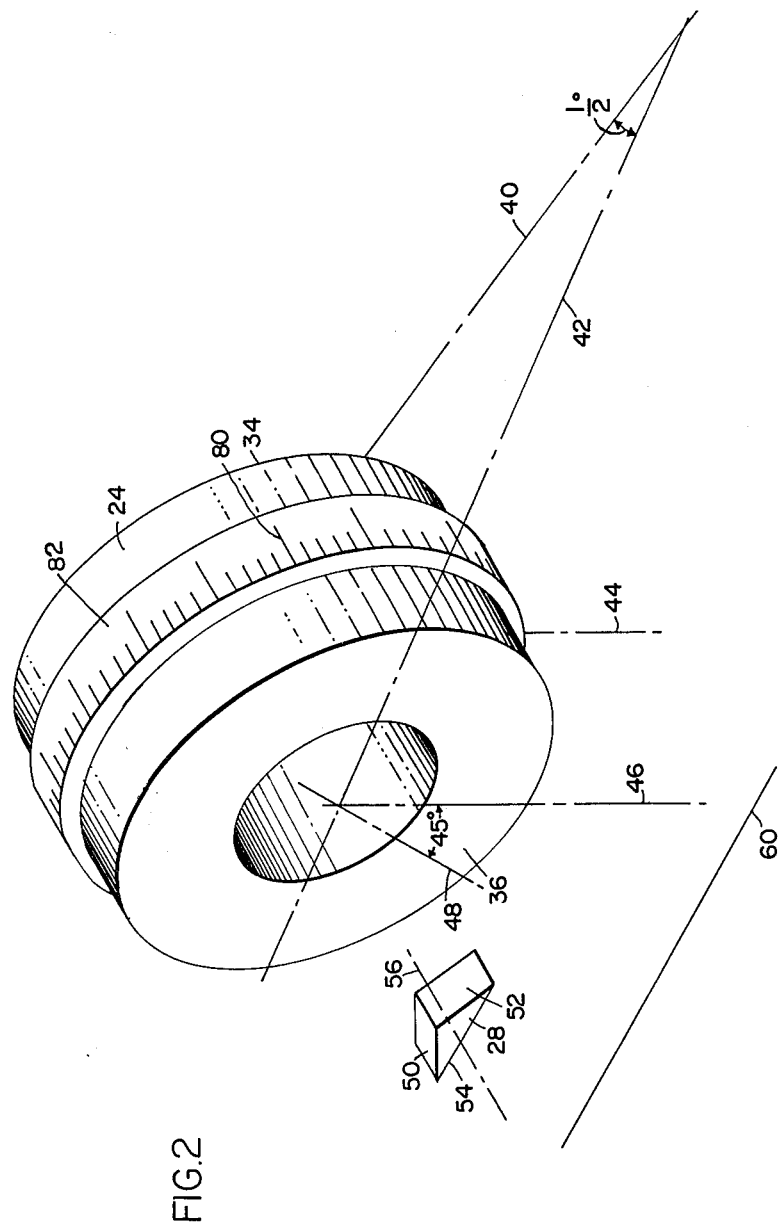

March 2, 1965 B. BENDER 3,171,208
MEASURING INSTRUMENT
Filed June 29, 1961 4 Sheets-Sheet 3
FIG. 4
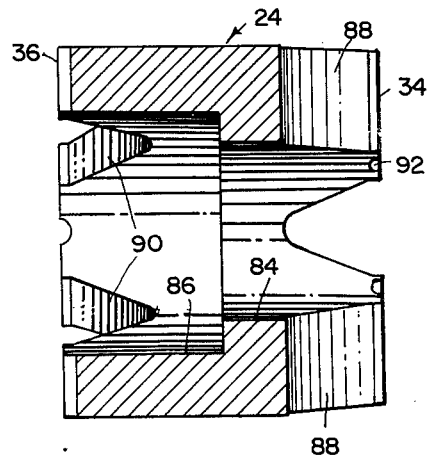
FIG. 6
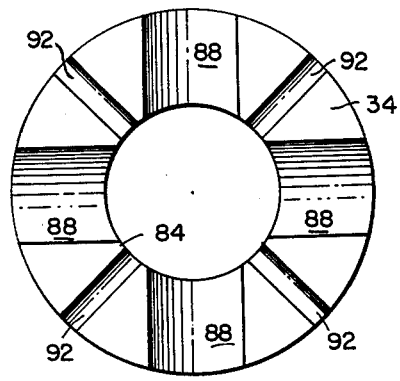
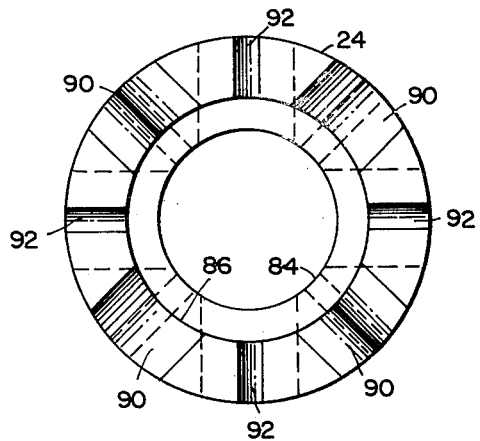
FIG. 5
INVENTOR.
BAXTER BENDER
BY
Ezekiel Wolf, Wolf & Greenfield
ATTORNEYS

United States Patent Office

3,171,208
Patented Mar. 2, 1965

3,171,208
MEASURING INSTRUMENT
Baxter Bender, P.O. Box 1, Mineola, N.Y.
Filed June 29, 1961, Ser. No. 120,611
12 Claims. (Cl. 33—46)

This invention relates to instruments for positioning a member in a desired physical relationship with respect to an established reference. The invention is peculiarly suitable for use as a gage in aligning the wheels of such vehicles as automobiles.

At the present time several different types of devices are available for analyzing toe-in, camber, caster and king pin inclination of automobile wheel assemblies. One of the most commonly used instruments for measuring camber, caster and king pin inclination includes an electromagnet or permanent magnet for coupling the frame of the instrument to the wheel mounting assembly of the automobile. The frames of such instruments or gages carry a plurality of spirit levels that are provided with calibrations and in certain instances the levels are movable with respect to the frame, for rendering the desired measurements. These gages ae expensive, fragile, and often in need of repair. The instruments now available for measuring toe-in also include the same type of magnetic coupling and are expensive, heavy and cumbersome to handle, and fall into disrepair. The toe-in devices are particularly heavy and cumbersome as they extend between and simultaneously engage the wheel hubs of the two wheels being aligned.

The primary object of my invention is to provide a relatively simple and inexpensive gage suitable for adjusting such wheel aligning measurements as toe-in and camber.

Another important object of my invention is to provide a new form of coupling device capable of itself establishing a reference between one of its surfaces and the surface of the member to which the coupling is connected.

Yet another important object of my invention is to provide a coupling device which may join two separate members without the aid of fasteners or any form of moving parts.

Still another important object of my invention is to provide a coupling device which may be secured to the wheel hubs of substantially all domestic and foreign automobiles regardless of the size of the nut on the spindle supporting the wheel, without the use of adapters, spacers or other forms of compensating devices.

To accomplish these and other objects my invention includes among its many important features a magnetic coupling device capable of simultaneously holding at each end a device made of magnetic material. The coupling device itself is made in the form of a cylinder having machined surfaces at its ends each of which is adapted to engage the machined surface of the wheel hub which is to be aligned. Openings formed in each of the end faces concentric with the cylindrical axis are of different diameter so that they may receive nuts of different sizes on the end of the spindle supporting the wheel hub to be aligned. The different sizes of openings afford use of the coupling device on both foreign and domestic cars of virtually all sizes.

The end faces of the cylindrical coupling device are not exactly parallel, but rather deviate from parallelism a small prescribed amount. The angle defined by the two machined end faces and more particularly by their center lines in the direction of conversion may form an angle in the order of ¼° or ½°. While the two machined sides converge toward one another in one direction, they are parallel to one another in a direction displaced 90° from the direction of maximum convergence. Embossed or otherwise noted circumferentially about the cylindrical wall of the coupling device is a scale which bears a functional relationship to the angle of convergence of the end faces in different radial directions from the cylindrical axis. By means of the scale, the angular relationship between radially extending lines in the planes of the two end faces of the coupling device may be readily determined.

Detachably connectable to either of the end faces of the coupling device is a ring or disc made of magnetic material. The disc in turn supports or carries an optical device in the form of a prism having a known physical relationship to the face of the disc engaging the face of the coupling device. That face of the disc is also machined so that a very precise physical relationship is established and maintained between it and the optical device which it carries. The optical device which it carries is adapted to establish a relationship between the machined surface of the disc and a reference line viewable through the prism. Thus, the optical device may serve to position that face of the disc with respect to a reference line and in turn therefore serve to locate the machined surface of the wheel hub or other device being aligned by the gage. Because the coupling device may be displaced circumferentially on the wheel hub to orient the parallel radial lines lying in the planes of the end faces in any position or direction, the machined surface of the wheel hub may be positioned parallel to or deviate some desired angle from a reference line viewable through the optical device. In this manner, toe-in and camber of the front wheels of a vehicle may be measured and thereafter be set to the desired condition.

In its broader aspects, my invention may thus be characterized as a gage having a coupling device adapted to secure a measure or indicator to a wheel hub in a number of different positions so that the user may orient the measure or indicator in selected angular relationships to the hub. The coupling device itself may be characterized as having a pair of faces that are oriented in a known angular relationship to one another and each face is magnetized to secure the coupling device between two members without other fasteners or connectors.

These and other objects and features of my invention, along with its incident advantages, may be better understood and appreciated from the following detailed description of one embodiment thereof, selected for purposes of illustration and shown in the accompanying drawing, in which:

FIG. 2 is a diagrammatic view illustratig the operation of the gage shown in FIG. 1;

FIG. 4 is a cross sectional view of a preferred form of coupling device forming part of the gage shown in FIG. 1;

FIGS. 5 and 6 are end views of the coupling device shown in FIG. 4; and

Figure 1:
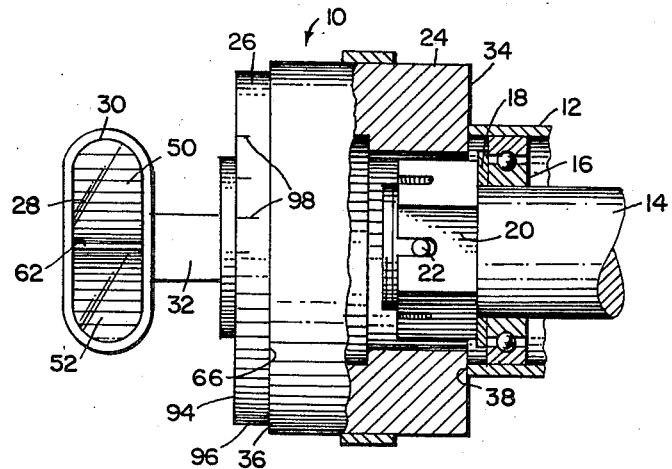
FIG. 1 is a plan view partially in section of a wheel aligning instrument or gage constructed in accordance with my invention, mounted on the wheel hub of a typical automobile wheel assembly.

The gage 10 is shown in FIG. 1 to be mounted on a wheel hub 12 forming part of a standard wheel mounting assembly which also includes a spindle 14, bearings 16, washer 18, hexagonal castillation nut 20 and a cotter pin 22.

The gage 10 includes a magnetic coupling device 24, a detachable disc 26 and an optical device in the form of a prism 28. The prism 28 is supported within a frame 30 secured by means of rib 32 to the disc 26. The magnetic coupling device, generally cylindrical in shape, has a pair of machined end faces 34 and 36, each of which is adapted to bear against the machined end face 38 of the wheel hub. Thus, in FIG. 1, the machined end face 34 of the coupling device 24 is shown disposed against the machined face 38 of wheel hub 12, but as will be more fully described below, the coupling device may be reversed so that its face 36 bears against the face 38 of hub 12.

In FIG. 2 the coupling device 24 is represented diagrammatically as a cylinder having an axial bore and smooth end faces 34 and 36. The detail features of the coupling device shown in FIGS. 4–6 and described below pertaining to the magnetic characteristics of the coupling device are omitted in FIG. 2 for purposes of clarity. The two end faces 34 and 36 of the cylindrical body are shown in the figure to converge in the direction of radial lines 40 and 42 lying in the planes of the faces 34 and 36, respectively, to define an angle of ½° between them. If the maximum angle of convergence between the faces 34 and 36 is in the radial direction of lines 40 and 42 with respect to the axis of the cylinder, the two radial direction lines 44 and 46 displaced 90° from the lines 40 and 42 and also lying in the planes of the faces 34 and 36, respectively, must be parallel to one another. If the direction and included angle between lines 40 and 42 is known, it will be recognized that the physical angular relationship between all radially directed lines lying in the planes of the faces of the coupling device may readily be determined mathematically. Thus, the physical relationship between radial line 46 and line 44 similarly radially directed and in the plane of face 34 is known to be one of parallelism, and the physical relationship between line 48 lying in the plane of face 36 and passing through its center and the similarly directed radial line in face 34 is known to deviate from parallelism by ¼° if the line 48 is displaced 45° from the line 46, as suggested in the drawing.

The optical device or prism 28 cooperates with the described physical characteristics of the end faces 34 and 36 of the coupling device to set or measure the relationship between an object lying in the plane of one of the two end faces of the coupling device and an established reference which may be a line viewable through the optical device.

Figure 3:
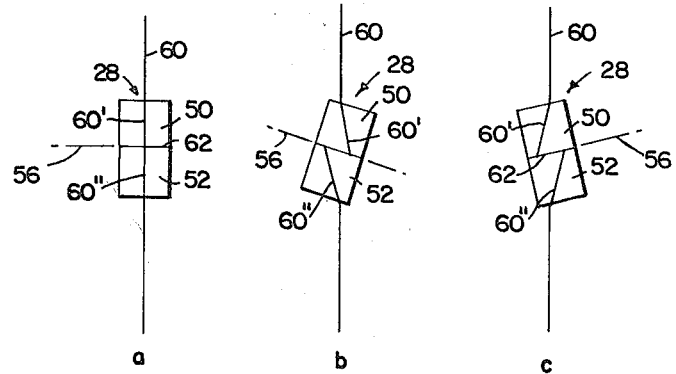
FIGS. 3a–3c are diagrammatic views illustrating the manner in which the optical part of the gage operates.

In FIGS. 3a–3c the manner in which the optical device functions with a line of reference is shown. The illustrated prism has a triangular cross section with faces 50, 52 and 54 arranged parallel to a transverse center line 56 (see FIG. 2). In FIG. 3, a reference line 60 is shown viewed through the prism 28 when the prism is in three different positions. In FIG. 3a the transverse center line 56 is disposed normal to reference line 60, and the line 60 when viewed through the prism and more particularly through planes 50 and 52 is continuous with the two portions of the line 60' and 60" meeting at the apex 62 of the prism. When the prism is turned so that its transverse center line 56 is displaced from a position normal to the line of reference 60, the reference line when viewed through the prism is interrupted, being sheared at the apex 62 as in FIG. 3b. In FIG. 3c the prism is shown displaced in a direction opposite to that in FIG. 3b and the line 60 is again shown to be sheared along the apex 62. Thus, the optical device may be oriented so that its transverse center line 56 is exactly perpendicular to the line of reference 60 by viewing the line of reference through the prism and moving the prism to a position wherein the reference line is continuous, as in FIG. 3a.

From the foregoing, it will be recognized that if the transverse center line 56 of the prism 28 is oriented normal both to the reference line 60 and the face 36 of the coupling device, a radially directed line lying in the plane of face 34 and also in a plane parallel to the reference line may be parallel to or form an angle of ½° or less with the reference line, depending on the circumferential orientation of the coupling device. Thus, if the prism is oriented with its transverse center line 56 normal to surface 36 and the coupling device 24 is oriented in the circumferential position shown in FIG. 2, then if the whole assembly is moved until the line of reference 60 when viewed through the prism is unbroken, the horizontal radial center line of face 34 of the coupling device forms an angle of ½° with the line of reference. If the coupling 24 is rotated 45° from the position shown so that the direction line 48 lies in a horizontal plane and the prism remains fixed, a horizontal line in the plane of face 34 will form an angle of ¼° with the line of reference 60. Further rotation of the coupling device so that the lines 44 and 46 lie in a horizontal plane will place horizontal lines in the plane of the face 34 exactly parallel to the reference line 60.

Referring again to FIG. 1, the disc or ring 26 is provided with a machined surface 66, and the frame 30 and rib 32 support the prism 28 so that its center line 56 is normal to the machined face 66 of the disc. The disc and prism are permanently joined to preserve this relationship. Thus, when the machined face 66 of the disc 26 is mounted on one of the machined faces 34 or 36 of the coupling device, the transverse center line 56 of the prism is normal to the adjacent face of the coupling device.

Figure 7:
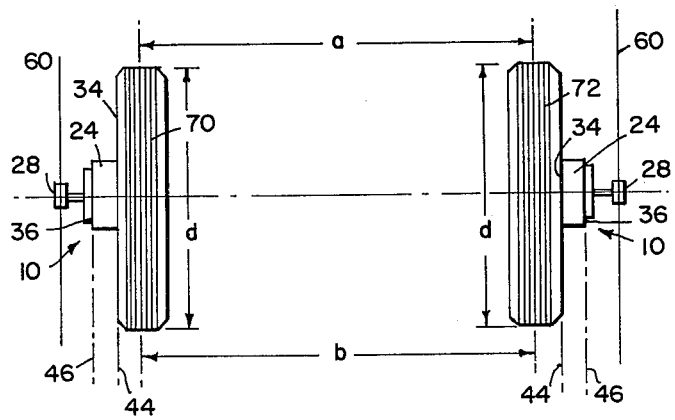
FIGS. 7 and 8 are diagrammatic views showing the manner in which the gage may be used to measure and set toe-in and camber of automobile wheels.

Having described in detail the characteristics of the coupling device and optical device that enable them to function together to orient a plane in a desired relationship to a reference, I will now describe the manner in which the gage may serve to set the toe-in and camber of automobile wheels. In FIG. 7 a pair of automobile wheels are each shown to carry a gage 10 having a coupling device 24 and an optical device 28, with each optical device 28 generally aligned with a reference line 60 established on the floor adjacent the wheels. The lines 60 would be established parallel with one another on the floor supporting the tires 70 and 72 on the wheels to serve as references for setting toe-in. Toe-in is measured normally in inches and is the difference between the distance separating the front edges of the tires 70 and 72 at spindle height represented by distance *a* and the distance separating the rear edges of the tires at the same height, represented by distance *b*. Thus, toe-in is expressed in inches as the difference between distances *a* and *b*. If distance *b* exceeds *a*, toe-in is present and if *b* is less than *a* the condition is described as toe-out.

To illustrate the use of the gage, assume that the diameter *d* of each tire is twenty-four inches and that the maximum angle of convergence between the end faces 34 and 36 of each coupling device is ½°. Assume also that the specification of the automobile under test calls for a toe-in setting of zero inches (measurement *a* equals measurement *b*). The serviceman may conveniently set the coupling devices on each wheel hub with the direction lines 44 and 46 disposed in a horizontal plane. If the serviceman then places the discs 26 on the exposed faces of the coupling devices, he may then readily set the tires 70 and 72 with zero toe-in by moving each tire until the reference lines 60 when viewed through the prisms are continuous and unbroken. Should the specification of the automobile call for a toe-in of one-half inch (distance *b* one-half inch greater than *a*) the coupling devices should be turned to the position shown in FIG. 8 wherein the horizontal center lines of the faces 34 and 36 converge rearwardly and form an angle of ¼° with one another. This angle is exaggerated in the drawing for clarity. Thus, the direction line 48 should be oriented in a position parallel with the floor. If the coupling devices are positioned in that manner on the machined surfaces of the hubs of the wheels bearing the tires 70 and 72, the inner edges of the tires at the limits of distance *a* will move toward one another approximately one-quarter of an inch and similarly the points of the tires 70 and 72 defining the limits of distance $b$ will move apart approximately one-quarter of an inch from the position defined above for zero toe-in, when the reference lines 60 appear unbroken through the prisms. These results may readily be established mathematically. The manner in which the actual adjustment of the wheels is made to align the reference lines when viewed through the prism obviously forms no part of this invention, as it is related to the automobile steering mechanism and not the gage. However, it should be noted that the condition of each of the two wheels is interdependent as they are connected by a tie rod. As a result, two gages are generally employed, one on each wheel, to measure and set the toe-in of the wheels. Ordinarily, tie rod adjusting sleeves are provided for each wheel and they are set simultaneously to establish the correct toe-in.

Figure 8:
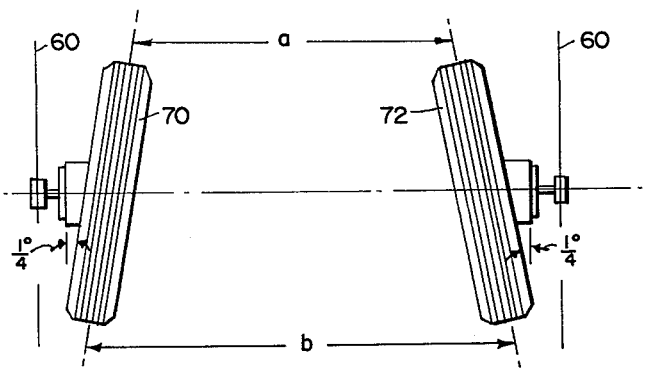

The camber of wheels may also be measured and set readily by the use of my gage, and FIGS. 7 and 8 illustrate this use of the gage, as well. Camber is the outward or inward tilt of the tire when compared with a true vertical line. Unlike toe-in, camber for each wheel is independent of and may be set without regard to the other wheels. When the top of the tire is tilted inwardly it has negative camber, and when the top of the wheel is tilted outwardly it is said to have positive camber. Automobile specifications of course vary for different makes and models, but for greatest tire life the camber is normally specified as approximately ½° positive at curb weight. To accomplish this setting of the wheel the coupling device 24 should be mounted on the wheel hub with the direction lines 40 and 42 oriented vertically and converging upwardly. The optical device 28 should be mounted on the outwardly facing machined surface of the coupling device in a position wherein its surface 54 is approximately vertical. When assembled on the wheel in that manner, a positive camber of one-half degree may be established by moving the wheel so that an established vertical reference line appears unbroken as in FIG. 3a when viewed through the prism. The vertical reference line may be established as a line scored or painted on the wall of the station, or by a plumb line hung adjacent the prism or by other means.

Having described the manner in which the gage may be used to set such conditions as toe-in and camber of vehicle wheels, the function performed by scale 80 carried on ring 82 about the waist of the coupling device may now be appreciated. The ring 82 may be sweated on or otherwise secured to the coupling device above its midsection in fixed relationship thereto, to avoid any angular displacement of the ring relative to the body of the coupling device. The scale 80 carried on the coupling device may be graduated in degrees, inches, or both depending upon the particular use contemplated for the gage. For example, as a scale for setting wheel camber, the scale 80 could be graduated in fractions of degrees running from 0° in the plane direction lines 44 and 46 to ½° in the plane of direction lines 40 and 42. Thus, the graduation on the scale 80 aligned with the direction line 48 could bear a ¼° marking. The scale could also be graduated in fractions of inches to aid in the measurement or setting of toe-in. It will be clear from the foregoing that if the scale is to be set in inches, it will necessarily have to take into consideration the approximate diameter of the tires on the wheels to be set or measured as the diameter is a factor along with the angle of convergence of the machined faces 34 and 36 of the coupling device, in toe-in measurements with the gage.

The scales 80 on the rings 82 may extend about the full 360° of the coupling device rather than be confined to a single quadrant of the frame, as such additional scales may indicate positive and negative camber and toe-in and toe-out of wheels. The scales, for convenience, may be duplicated on each edge of the ring 82 for reasons made clear below.

It has been suggested that each of the faces 34 and 36 of the coupling device 24 be made as a permanent magnet to enable the disc 26 carrying the optical device 28 to be readily secured to one face of the coupling device and enable the other face of the device to be mounted on the machined face of the wheel hub. To further enhance the versatility of the coupling device as well as the gage itself, the bores or openings 84 and 86 extending axially inwardly from the end faces 34 and 36 should be of different diameter. In this way, the coupling device may be used conveniently without adapters, spacers, or special rings on substantially all foreign and domestic automobiles. Most foreign cars as well as the "compact" models made domestically use smaller hexagonal nuts to retain the wheel hub on the spindle than the standard size domestically manufactured automobiles. If the opening in the coupling device fits rather snugly on the hexagonal nut, the walls of the opening may physically grip the nut to supplement the magnetic connection between the end face of the coupling device and machined face of the wheel hub. By selecting a diameter for the opening 84 which just slightly exceeds the major diameter of the smaller hexagonal nuts used on "compact" and foreign automobiles, and by selecting a diameter for the opening 86 which just exceeds the diameter of the hexagonal nuts used on standard size domestic automobiles, the coupling device may work with maximum advantage on substantially all types of automobiles.

In FIGS. 4–6 it is clear that the coupling device is generally annular in shape and the wall of the device is provided with axially extending V-shaped grooves directed away from the end faces. The V-shaped grooves 88 extend inwardly from end face 34 of the body 24 and V-shaped grooves 90 extend inwardly from the end face 36. Careful viewing of FIGS. 4–6 also reveals that the V-shaped grooves 88 are displaced circumferentially with respect to the V-shaped grooves 90, to provide the coupling device with greater physical strength than would exist if they were aligned with each other. It will also be noted in those figures that the resulting pole faces formed in the end faces between the V-shaped grooves are scored with shallow recesses 92 that serve to divide the pole faces into two parts which respectively cooperate with the adjacent parts of the next pole faces to form, in a sense, several independent U-shaped magnets.

Referring again to FIG. 1, the reader will now appreciate that the V-shaped grooves in the end faces 34 and 36 of the coupling device may serve to receive the ends of the cotter pin 22 which lie beyond the ends of the castillated faces of the hexagonal nut 20. Because the V-shaped grooves 88 and 90 will receive the ends of the cotter pin, the diameters selected for the openings 84 and 86 may be very close to the major diameters of the castillation nuts, so that a substantial mechanical gripping action occurs between the walls of the openings and the nuts.

To facilitate the general circumferential alignment of the disc 26 with a selected line on the scale 80 of the ring 82 on the coupling device, the end face 94 and/or the cylindrical wall 96 of the ring 26 may be provided with one or more reference markings 98 which serves as a sight line visible with the scale.

From the foregoing description, those skilled in the art will appreciate that my invention may be used not only in the alignment of vehicle wheels but may be used to align virtually any plane in a selected relationship with an established reference line. Because of its wide variety of uses, the device is particularly susceptible to modification, without departing from the teachings herein contained. For example, the prism illustrated has angles of 45°, 45° and 90°, and this shape may be convenient for certain applications. However, for many applications, the prism may have other angles without changing the ability of the instrument to perform its intended functions. Therefore, I do not intend to limit the breadth

What is claimed is:

1. A gage for setting toe-in and camber of a vehicle wheel comprising a coupling device having a pair of opposed machined surfaces defining a small angle between them with one of said surfaces being adapted to engage the machined surface of the vehicle wheel, a disc removably mounted on the other machined surface of the coupling device and capable of being mounted in a number of different positions on the surface, an optical instrument fixed to the disc and adapted to indicate its angular position with respect to an established reference, and a scale carried by the coupling device for indicating the relative physical relationship of the optical device and the machined surface of the vehicle wheel.

2. A gage for setting a wheel in a selected relationship to a reference line comprising a coupling device having a pair of opposed surfaces at least one of which is adapted to be mounted on the wheel, said surfaces being nonparallel and having a known angular relationship with respect to each other, means including an optical device adapted to be mounted on the other surface in a known relationship thereto, said optical device being capable of indicating its position relative to a reference, and indicating means provided on the coupling device for indicating the physical relationship between the optical device and the surface of the coupling device mounted on the wheel.

3. A coupling device for holding an instrument to the surface of a vehicle wheel comprising a cylindrical member having a pair of end faces deviating from parallel a known amount in one radial direction and being parallel to each other in another radial direction, a graduated scale affixed to the cylindrical member and extending over the arc between the two radial directions, and openings extending inwardly from each of the end faces, said openings having different diameters for receiving the nuts of vehicle wheels when either of the end faces is mounted on the surface of the vehicle wheel.

4. A coupling device for holding an instrument to the surface of a vehicle wheel comprising a cylindrical member having a pair of end faces deviating from parallel in one radial direction and being parallel in another radial direction, a scale affixed to the surface of the cylinder over the arc between the two radial directions, permanent magnet defining means forming part of the member and rendering each of the end faces of the member magnetic, openings formed in the two end faces of the member and being of different diameter for receiving the nuts of vehicle wheels when either of the end faces is mounted on the surface of the vehicle wheel.

5. In combination with the coupling device defined in claim 4, a plate made of magnetic material and having a face adapted to engage singly either of the faces of the member, and means carried by the plate and adapted to indicate its angular position relative to an established reference.

6. In combination with the device defined in claim 4, a plate made of magnetic material and having a face to engage singly either of the end faces of the member, and means mounted on the plate and having a known physical relationship to the face of the plate for indicating the relationship of the end faces of the coupling device relative to an established reference.

7. A combination as defined in claim 6 further characterized by the scale affixed to the cylindrical surface of the member being a function of the angular increments of displacement from the radial direction wherein the faces are parallel.

8. A combination as defined in claim 7 wherein the means mounted on the plate includes a prism through which a reference line when viewed appears continuous when the prism is disposed in a selected position with respect to the line.

9. A combination as defined in claim 8 further characterized by the end faces of the member and the face of the plate being machined surfaces and wherein the prism has its transverse center line parallel to the prism surfaces disposed normal to the face of the plate.

10. In combination with the device defined in claim 3, a plate having a face adapted to engage singly either of the end faces of the member, and means mounted on the plate and having a known physical relationship to the face of the plate for indicating the relationship of the end face of the coupling device relative to an established reference, said means including a prism through which a reference line when viewed appears continuous when the prism is disposed in a selected position with respect to the line.

11. A combination as defined in claim 10 further characterized by the end faces of the member and the face of the plate being machined surfaces and wherein the prism has its transverse center line parallel to the prism surfaces disposed normal to the face of the plate.

12. A coupling device as defined in claim 3 further characterized by slots formed in the member and extending radially from the openings for receiving pins extending from the nuts.

References Cited by the Examiner

UNITED STATES PATENTS

| 1,092,867 | 4/14 | Sellew | 248—180 |
|---|---|---|---|
| 1,182,881 | 5/16 | Frye | 33—46 X |
| 2,074,108 | 3/37 | Graham | 33—203.18 |
| 2,232,689 | 2/41 | Breihan | 33—203.18 |
| 2,577,841 | 12/51 | Creagmile | 33—203.18 |
| 2,645,860 | 7/53 | Bender et al. | 33—203.18 |
| 2,729,896 | 1/56 | Rosenblum | 33—203.18 |
| 2,913,830 | 11/59 | Schroter | 33—174 |
| 2,974,417 | 3/61 | Prince | 33—174 |

FOREIGN PATENTS 486,983  11/29  Germany.

ISAAC LISANN, *Primary Examiner.*

LOUIS R. PRINCE, LEYLAND M. MARTIN,
*Examiners.*